(12) United States Patent
Futami

(10) Patent No.: US 6,910,791 B2
(45) Date of Patent: Jun. 28, 2005

(54) HEADLIGHT

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 10/252,010

(22) Filed: Sep. 23, 2002

(65) Prior Publication Data

US 2003/0174509 A1 Sep. 18, 2003

(30) Foreign Application Priority Data

| Mar. 15, 2002 | (JP) | .................................... | 2002-072095 |
| Aug. 29, 2002 | (JP) | .................................... | 2002-250351 |

(51) Int. Cl.$^7$ ............................. F21V 13/04; B60Q 1/04
(52) U.S. Cl. ....................... 362/517; 362/299; 362/301; 362/305; 362/328; 362/346; 362/521; 362/538
(58) Field of Search ................................ 362/296–305, 362/308, 328, 346, 511, 516–518, 520–522, 538, 539, 332

(56) References Cited

U.S. PATENT DOCUMENTS

| 3,796,886 | A | * | 3/1974 | Freeman | ..................... 362/303 |
| 4,727,458 | A | * | 2/1988 | Droste et al. | ............... 362/539 |
| 4,949,226 | A | * | 8/1990 | Makita et al. | .............. 362/538 |
| 5,070,432 | A | * | 12/1991 | Kitazumi et al. | ........... 362/538 |
| 5,967,647 | A | * | 10/1999 | Eichler | ....................... 362/304 |
| 6,050,705 | A | * | 4/2000 | Kusserow et al. | .......... 362/299 |
| 6,132,074 | A | * | 10/2000 | Bristle et al. | ............... 362/538 |
| 6,220,736 | B1 | * | 4/2001 | Dobler et al. | ............... 362/539 |
| 6,244,732 | B1 | * | 6/2001 | Futami et al. | .............. 362/328 |

FOREIGN PATENT DOCUMENTS

| JP | 2-189802 | 7/1990 |
| JP | 2-192602 | 7/1990 |

* cited by examiner

Primary Examiner—Alan Cariaso
(74) Attorney, Agent, or Firm—Morgan, Lewis & Bockius LLP

(57) ABSTRACT

A headlight having an ellipse group reflecting surface as a main reflecting surface and a projection lens further includes a second reflecting surface, a third reflecting surface, and a ring-shaped lens. Direct light from a light source reaching to a space between the main reflecting surface and the projection lens is reflected by the second reflecting surface backward. The reflected light from the second reflecting surface is further reflected by the third reflecting surface, and then is adjusted with the ring-shaped lens. Light directly emitted from the light source and being ineffective in the conventional headlight can be collected using the second and third reflecting surfaces, and forwarded in an illumination direction by passing through the ring-shape lens such that the shape of the light is controlled to provide an appropriate shape, thereby contributing to the formation of light distribution characteristics and increase in the light intensity.

20 Claims, 6 Drawing Sheets

HEADLIGHT

This invention claims priority benefit to Japanese Patent Applications No. 2002-250351, filed on Aug. 29, 2002, and Japanese Patent Applications No. 2002-72095, filed on Mar. 15, 2002, the disclosures of which are hereby incorporated by reference.

BACKGROUND OF THE INVENTION

1. Field of the Invention

The present invention relates to a lamp such as a headlight or a fog lamp mainly used for a lighting equipment of a vehicle. More specifically, the present invention relates to a lamp referred to as a projection lamp which adopts a reflecting mirror based on a curve of an ellipse having two focuses, a first focus and a second focus, where a cross sectional shape of light that converges to the second focus is projected in the illumination direction using a projection lens to obtain predetermined light-distribution characteristics of the lamp.

2. Description of the Related Art

FIG. 1 is a diagram that illustrates an exemplified configuration of a conventional lamp 90 referred to as a projector-type lamp. This lamp 90 has a light source 91, an ellipse group reflecting surface 92, and a projection lens 93. The ellipse group reflecting surface 92 includes a spheroidal group reflecting surface, a composite ellipse group reflecting surface, or an ellipse free-form surface. The light source 91 is arranged at a position substantially corresponding to a first focus of the reflecting surface 92. As shown in the figure, a shade 94 may be provided if required. The projection lens 93 is attached on the ellipse group reflecting surface 92 through a lens holder 95. As the lamp 90 is constructed as described above, a light source image generated by converging to a second focus of the reflecting surface 92 is magnified by projection through the projection lens 93, resulting in the generation of illuminating light.

At this time, if the light distribution characteristic, for example which consists of low beams but not high beams, is required, a lower half of light beams converging from the light source 91 to the second focus is covered with the shade 94. Therefore, the light projected from the projection lens 93 has the desired light distribution characteristics without including any high beam.

In the conventional projector-type lamp 90 as constructed above, however, the projection lens 93 which is made of an aspheric lens has a small aperture and a light-emitting area of such a lens 93 is not large. Therefore, there is a problem of poor visibility from an oncoming vehicle, a pedestrian, or the like. In addition, the shade 94 blocks almost half of the amount of light at the time of making a low beam distribution. As a result, there is another problem of lowering the utilization factor of beam with respect to the light source 91.

Furthermore, in the case of the projector-type lamp 90, the projection lens 93 can only be observed from the outside. Although there are some dimensional differences in the projection lenses 93, their designs are substantially the same because of their constructional reasons. In other words, they have no differences in appearance, so that their designs can be poor.

SUMMARY OF THE INVENTION

To solve the problems mentioned above, it is an object of the present invention to provide a headlight which can effectively utilize light emitted from the light source to improve the utilization factor of light beams. It is another object of the present invention to provide a headlight which can improve its safety. It is still another object of the invention to provide a headlight which can provide different appearances from the conventional headlight and aesthetics.

The above object of the invention can be attained by providing the following aspects of the invention.

According to a first aspect of the invention, there is provided a headlight, employing a projection system having a light source, an ellipse group reflecting surface, and a projection lens, the headlight including: a second reflecting surface, shaped like a ring or a ring with a notched portion, for reflecting light directly reaching to a space between the ellipse group reflecting surface and the projection lens among light emitted from the light source such that the light is reflected backward in a direction opposite to an illumination direction of the headlight, the second reflecting surface being provided around the projection lens; a third reflecting surface, shaped like a ring or a ring with a notched portion, for reflecting the light, reflected from the second reflecting surface, toward the illumination direction of the headlight; and a ring-shaped lens, shaped like a ring or a ring with a notched portion, the ring-shaped lens being arranged on a side in the illumination direction of the third reflecting surface.

In the headlight described above, it is preferred that the second reflecting surface be a flat surface; that the third reflecting surface be provided as an ellipse group reflecting surface obtained by rotating an ellipse around a central axis of the headlight, the ellipse having a first focus in the vicinity of a position where a pseudo-light source of light, which light comes from the light source and is reflected by the second reflecting surface, is assumed and a second focus arranged on an outer side of the second reflecting surface and having a long axis inclined to the central axis of the headlight; and that the ring-shaped lens be a ring-shaped cylindrical lens obtained by rotating a sectional form of an aspheric lens having a focus thereof on a position corresponding to or behind the second focus of the third reflecting surface.

Further, the headlight may further include a lens holder for fixing the projection lens on the ellipse group reflecting surface, the lens holder having an opening for allowing light from the light source to pass therethrough to the second reflecting surface. In this configuration, the second reflecting surface and the third reflecting surface may be integrally formed together, and the opening may be formed except on a joint portion between the second reflecting surface and the third reflecting surface so that the light reflected from the second surface is irradiated onto the third reflecting surface.

It is preferred that each of the second reflecting surface and the third reflecting surface be a reflecting surface prepared by applying reflective means on a surface of a light-guiding body made of a transparent material.

Further, in the headlight configured above, a light-guiding lens or a diffusion lens may be arranged between the third reflecting surface and the ring-shaped lens.

In the headlight described above, at least one of joint portions of the second reflecting surface and the third reflecting surface and a wall portion of the ring-shaped lens may be colored with a color except a color of the ring-shaped lens.

Furthermore, a Fresnel lens may be formed on at least one of the projection lens and the ring-shaped lens.

Furthermore, a notched portion may be formed in part of the third reflecting surface and is provided with a second light source for irradiating light toward the ring-shaped lens.

Furthermore, a filter may be equipped around the light source for diffusing or coloring light to be emitted from the light source.

A second aspect of the present invention, there is provided a headlight, employing a projection system having a light source, an ellipse group reflecting surface, and a projection lens, the headlight including: a fourth reflecting surface, provided around the projection lens, for reflecting light directly reaching to a space between the ellipse group reflecting surface and the projection lens among light emitted from the light source such that the light is reflected in an illumination direction of the headlight; and a ring-shaped lens, shaped like a ring or a ring with a notched portion, the ring-shaped lens being arranged on the side in the illumination direction of the fourth reflecting surface.

In the headlight of the second aspect, it is preferred that the fourth reflecting surface be one selected from an ellipse group reflecting surface having a first focus located on the light source and a second focus located in the vicinity of the ring-shaped lens, a parabolic reflecting surface having a focus located on the light source, a flat reflecting surface, and a free curved reflecting surface.

In the headlight of the second aspect, a Fresnel lens may be formed on at least one of the projection lens and the ring-shaped lens.

In the headlight of the second aspect, a notched portion may be formed in part of the fourth reflecting surface and is provided with a second light source for irradiating light toward the ring-shaped lens.

In the headlight of the second aspect, a filter may be equipped around the light source for diffusing or coloring light to be emitted from the light source.

According to a third aspect of the invention, there is provided a headlight, employing a projection system having a light source, a main reflecting surface, and a projection lens, the headlight including: a peripheral light-emitting unit, provided around the projection lens, for irradiating light from the light source, wherein the peripheral light-emitting unit includes: a light-introducing part for receiving and guiding light from a position between the light source and the projection lens; an auxiliary reflecting surface having a concave curved surface; and a peripheral lens assembly at least comprising a peripheral-side lens and a forward-side lens which are provided as a cylindrical lens, and the auxiliary reflecting surface faces the peripheral lens assembly, and the peripheral-side lens of the peripheral lens assembly is provided as the cylindrical lens having a focus which is not positioned on the auxiliary reflecting surface or at a focus of the auxiliary reflecting surface.

In the headlight of the third aspect, the peripheral lens assembly may be configured to have a letter U cross section in a part thereof, the U cross section being composed of an inner peripheral-side lens, the forward-side lens, and the peripheral-side lens, and a line connecting between an inner surface bent portion and an outer surface bent portion, which are found in each of a connecting part between the inner peripheral-side lens and the front-side lens and a connecting part between the front-side lens and the peripheral-side lens, is located at a position where the line does not coincide with a substantial illumination direction of the headlight.

In the headlight of the third aspect, a cross section of an inner surface of the forward-side lens may be composed of a line having at least one bent portion.

According to the present invention as above, the direct light from the light source, which has been useless in the prior art, is corrected using the second reflecting surface and the third reflecting surface and is then directed in the illumination direction in a state where the shape or the like of light is controlled so as to be utilized in the formation of light distribution characteristics. Therefore, the brightness of such a kind of the headlight can be increased, so that the present invention exerts an extremely superior effect on the improvement of performance such as the improvement of visibility.

Furthermore, the recovery of direct light has an excellent effect on the decrease in harmful light to be irradiated to the outside or effect on preventing the generation of dazzling. In addition, the emitting area of the headlight may also be increased by the second and third reflecting surfaces, so that the visibility from the oncoming vehicle, pedestrian, or the like can also be improved. Safety can also be improved.

Since the inside of the headlight can be enlarged by the ring-shaped lens, the headlight may have a feeling of depth. In addition, it appears to be thick-walled and to be looked like a crystal glass. Furthermore, the configuration of each of the projection lens and the ring-shaped lens and the formation of steps on their positions may give the headlight a three-dimensional appearance.

Furthermore, the appearance of the headlight can be represented in many ways by applying a metallic luster treatment such as aluminum deposition or applying other coloring treatment on the wall portion of the ring-shaped lens or the joint portion between the second reflecting surface and the third reflecting surface. This makes it possible to provide the luxurious appearance, such as a crystal glass or the like or the colored appearance without changing its intrinsic functional color, so that the commercial value can be increased.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
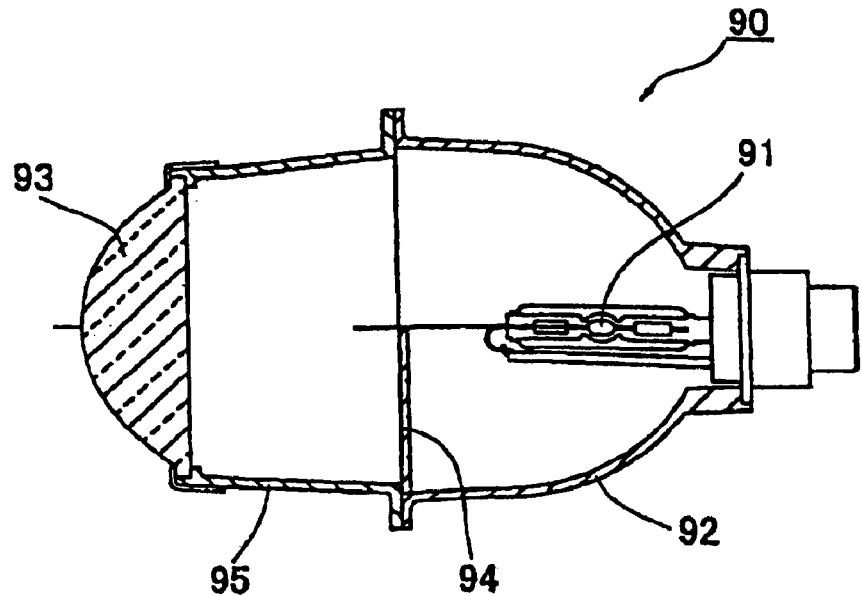
FIG. 1 is a cross sectional view showing a conventional headlight.

Hereinbelow, preferred embodiments of the present invention will be described in detail with reference to the accompanying drawings. Incidentally, in each embodiment, similar constitutional elements are denoted by the same reference numeral and explanation therefor will be omitted.

Figure 2:
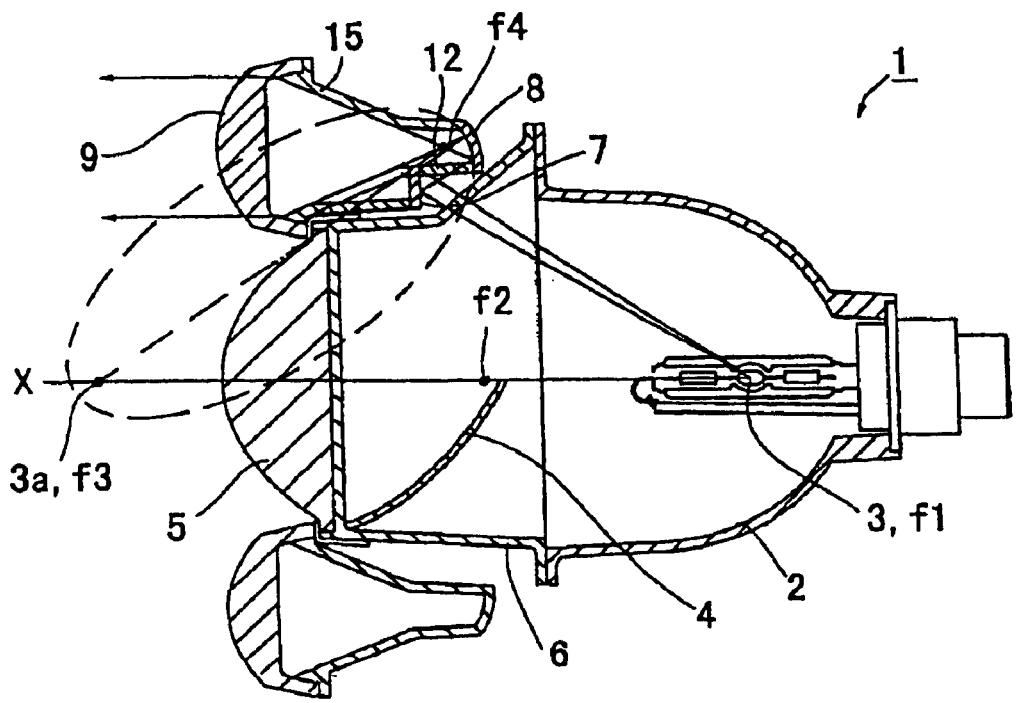
FIG. 2 is a cross sectional view showing a headlight according to a first embodiment of the present invention.

Referring now to FIG. 2, there is shown a headlight denoted by the reference numeral 1 as a first embodiment of the present invention. The headlight 1 includes an ellipse group reflecting surface 2, a light source 3, a shielding plate 4, a projection lens 5, and a lens holder 6. The ellipse group reflecting surface 2 has a major axis provided as a rotational axis which coincides with the axis X of the headlight 1 (axis passing through the center of the headlight 1). That is, such a surface 2 is obtained by rotating an ellipse around the rotational axis, so that the surface 2 can be used as a main reflecting surface. The light source 3 is located at a position substantially corresponding to a first focus f1 of the ellipse group reflecting surface 2. The shielding plate 4 is positioned in the vicinity of a second focus f2 of the ellipse group reflecting surface 2. The projection lens 5 is arranged coaxially on the axis X. In addition, the projection lens 5 is attached on the ellipse group reflecting surface 2 through a lens holder 6. As in the case with the conventional one, the headlight 6 constructed as described above is based on a projection system.

In this embodiment, in addition to the ellipse group reflecting surface 2, as shown in FIG. 2, the headlight 1 is provided with a second reflecting surface 7, a third reflecting surface 8, and a ring-shaped lens 9 which is arranged in front of the third reflecting surface 8 (peripheral light emitting unit). In the first embodiment, the second reflecting surface 7 is located at a position between the ellipse group reflecting surface 2 and the projection lens 5, where the second reflecting surface 7 can receive light directly from the light source 3. The second reflecting surface 7 is substantially orthogonal to the axis x of the headlight 1, so that light from the light source 3 can be reflected in a backward direction opposite to the illumination direction of the headlight 1.

At this time, the second reflecting surface 7 is provided on an outer peripheral portion near the projection lens 5 and is shaped like a ring or a ring with a notched portion. In the conventional headlight, the ellipse group reflecting surface 2 and the projection lens 5 are coupled with each other through the lens holder 6. Therefore, light from the light source 3 can be blocked by the lens holder 6. In the present first embodiment, the light can be guided, for example, by forming an opening on an optical path where the light travels from the light source 3 to the second reflecting surface 7 such that it directs to the second reflecting surface 7. Alternatively, instead of forming the opening, the lens holder 6 may be formed of a transparent material through which light passes.

The third reflecting surface 8 is arranged at a position where light emitted from the light source 3 and reflected on the second reflecting surface 7 is received. The third reflecting surface 8 faces in the direction which is substantially the same as the illumination direction of the headlight 1. Here, the shape of the third reflecting surface 8 will be described in more detail with the assumption that there would be a pseudo-light source 3a of the light source 3 reflecting on the second reflecting surface 7 and also that there would be an ellipse having a first focus f3 near the pseudo-light source 3a and a second focus f4 near the outer periphery of the second reflecting surface 7. The shape of the third reflecting surface 8 is provided as a part of the ellipse. This third reflecting surface 8 is also associated with the second reflecting surface 7, so that it may be shaped like a ring or a ring with a notched portion.

Here, the physical relationship among the second reflecting surface 7, the third reflecting surface 8, and the ring-shaped lens 9 with respect to the ellipse group reflecting surface 2 will be described. Among light beams emitted from the light source 3, the second reflecting surface 7 utilizes the light beams except those captured by the ellipse group reflecting surface 2. In other words, it is provided for capturing the direct light from the light source 3.

Therefore, as described above, the second reflecting surface 7 is provided ahead of the ellipse group reflecting surface 2 and the reflected light from the ellipse group reflecting surface 2 is also irradiated in this direction. To avoid the generation of interference, the second reflecting surface 7 is positioned near the outer periphery of the projection lens 5. At this time, the lens holder 6 is located at a position between the second reflecting surface 7 and the light source 3. Therefore, an opening is formed in a predetermined portion of the lens holder 6 so that the light from the light source 3 is allowed to reach to the second reflecting surface 7.

The reflective light from the ellipse group reflecting surface 2 converges to the second focus f2 thereof. In the first embodiment, the second reflecting surface 7 may be arranged in the vicinity of the second focus f2 of the ellipse group reflecting surface 2. In addition, it may be placed in the lens holder 6 to improve the rate of capturing direct light.

The third reflecting surface 8 reflects the light reflected from the second reflecting surface 7 in the direction of the axis X of the headlight 1. Therefore, the third reflecting surface 8 is arranged behind the second reflecting surface 7 and it is provided as one shaped like a ring on the outside. The surface shape of the third reflecting surface 8 is one shaped like a ring which can be obtained by assuming a pseudo-light source 3a of the light, which light is emitted from the light source 3 and reflected by the second reflecting surface 7, and further rotating a part of an ellipse having a first focus f3 at the position of the pseudo-light source 3a and a second focus f4 in the vicinity of the outer periphery of the second reflecting surface 7 around the axis X of the headlight 1.

The ring-shaped lens 9 is shaped like a letter U in cross section and is also shaped like a ring formed by rotating the cross section U turned sideways (see FIG. 2) around the axis X of the headlight 1 or one formed by cutting off a part of such a ring-shaped lens. The ring-shaped lens 9 has a focus in the vicinity of the second focus f4 of the ellipse of the third reflecting surface 8. In the first embodiment, the ring-shaped lens 9 is provided as a cylindrical lens, or an aspheric lens, while the focal length thereof may be adjusted within the range of 5 mm to 60 mm. The focal position of the ring-shaped lens 9 may be arranged behind the second focus f4 of the third reflecting surface 8 depending on the required light distribution.

In the first embodiment, as mentioned above, the light-shielding plate 4 is equipped in the headlight 1. The light-shielding plate 4 is curved or slanted from the side of the projection lens 5 to the position near the second focus f2 of the ellipse group reflecting surface 2 such that it does not prevent the light from the light source 3 from reaching to the second reflecting surface 7.

The reflecting surface 7, the third reflecting surface 8, and the ring-shaped lens 9 are integrally formed together through the joint portion 12 and the wall portion 15 and are then arranged on the periphery of the projection lens 5. In the first embodiment, as the alternative to provide them as an integrated component, each of them may be independently formed or may be further integrated with the lens holder 6.

Figure 3A:
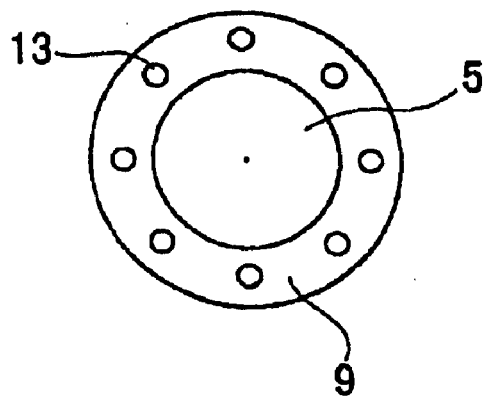
FIGS. 3A and 3B are front views showing variations of the shape of light irradiated from the ring-shaped lens in the headlight according to the first embodiment.
Figure 3B:
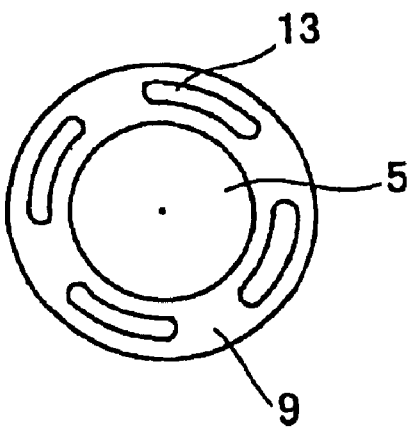

Referring now to each of FIG. 3A and FIG. 3B, there is shown a radial section for viewing the shape of light irradiated from the ring-shaped lens 9. In this case, each of the second reflecting surface 7 and the third reflecting surface 8 is placed on part of the periphery of the headlight 1 to change the state of light irradiated from the ring-shaped lens 9. The surface of the ring-shaped lens 9 receives light irradiated from the light-illuminating part 13 at the positions where the second and third reflecting surfaces 7 and 8 are formed. Therefore, various kinds of light-illuminating states can be realized by making variations to the positions and forms of the second and third reflecting surfaces 7 and 8.

Incidentally, in the first embodiment, the lens holder 6 is used. Therefore, the lens holder 6 may have an opening 6a (see FIG. 5) for allowing light from the light source 3 to reach to the second reflecting surface 7. Alternatively, the lens holder 6 may be made of a transparent material instead of forming such an opening.

In the first embodiment, the headlight 1 is configured as described above. Alternatively, the second reflecting surface 7 and the third reflecting surface 8 may be formed on the whole area of the outer periphery to allow the whole periphery to emit light, or an opening 6a may be formed in only a part of the lens holder 6 to attain a partial irradiation of light. Furthermore, the opening 6a, the second reflecting surface 7, the third reflecting surface 8, or the like may be shaped into a different form such that the shape of the area on which light can be incident may be shaped like a triangle or a square.

Next, the action and effects of the headlight 1 of the first embodiment as configured above will be described. In the present invention, the ellipse group reflecting surface 2, the light-shielding plate 4, and the projection lens 5 are configured without causing physical and optical interferences with the second reflecting surface 7 and the third reflecting surface 8 even though the second reflecting surface 7 and the third reflecting surface 8 are provided nearby. Therefore, the projection lens 5 performs the projection of light as is usually performed as in a typical projection type lamp. Therefore, for instance, the light distribution characteristics for low beam can be obtained.

On the other hand, the second reflecting surface 7 reflects only the light directly reaching from the light source 3. Then, the direct light is reflected from the second reflecting surface 7 toward the third reflecting surface 8. At this time, the third reflecting surface 8 is composed of a reflecting surface obtained by rotating an ellipse around the axis X. The ellipse has the first focus f3 and the second focus f4, the first focus f3 is positioned at a position of the pseudo-light source 3a assumed when the light emitted from the light source 3 is reflected from the second reflecting surface 7, and the second focus f4 is positioned in the vicinity of the outer periphery of the second reflecting surface 7. Therefore, the light reflected by the third reflecting surface 8 converges to the second focus f4 of the ellipse. In addition, the ring-shaped lens 9 having a focus in the vicinity of the second focus f4 is arranged ahead of the second and third reflecting surfaces 7, 8, so that light irradiated from the ring-shaped lens 9 can be irradiated as a light beam almost in parallel to the axis X of the headlight 1.

Incidentally, even though each of the above second reflecting surface 7, third reflecting surface 8, and ring-shaped lens 9 is basically configured as described above, it is a matter of course that the form or angle of the reflecting surface may be varied or a lens cut may be formed on the surface of the lens such that light can be emitted to obtain appropriate light distribution characteristics of the headlight 1 or angled. To obtain the desired light distribution characteristics, the ring-shaped lens 9 may be provided as a convex lens or a Fresnel lens. If it is shaped like a Fresnel lens, it is possible to set a pitch of division to 3 mm or more in order to obtain a feeling of heavy wall thickness or a feeling of a crystal glass.

According to the present embodiment, direct light from the light source can be used as illumination light, which has been impossible to use in the configuration of the conventional headlight. Therefore, it becomes possible to increase the rate of utilizing light beams with respect to the light source 3, so that a brighter headlight 1 can be realized. In addition, in general, uncontrolled direct light has been deleterious in the conventional headlight because it would cause dazzling light or the like. According to the present invention, on the other hand, the second reflecting surface 7 and the third reflecting surface 8 control the direct light to obtain effective light, while increasing the quality of light distribution characteristics.

Figure 4:
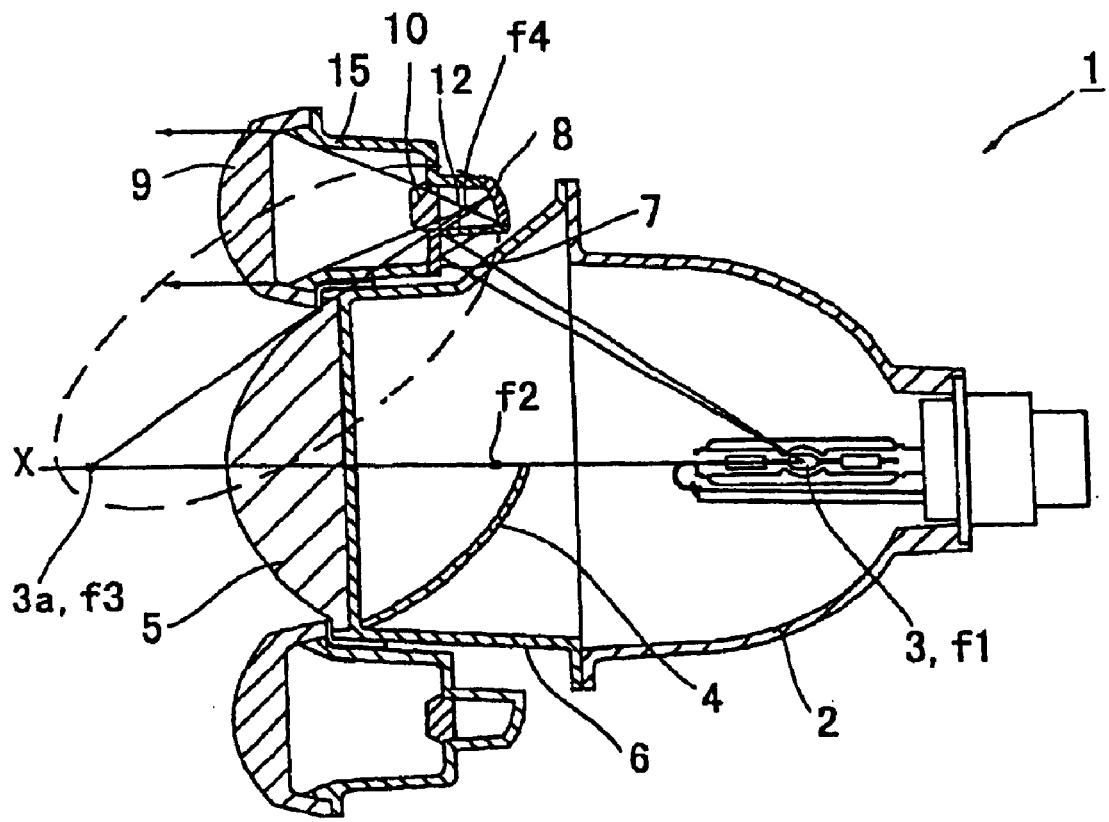
FIG. 4 is a cross sectional view showing a headlight according to a second embodiment of the present invention.

FIG. 4 shows a second embodiment of the present invention. In this second embodiment, just as in the case with the first embodiment, a headlight 1 of a projection system includes a second reflecting surface 7, a third reflecting surface 8, and a ring-shaped lens 9. In addition, the reflecting surfaces 7 and 8 and the ring-shaped lens 9 are constructed by the same way just as in the first embodiment, respectively.

The second embodiment is different from the first embodiment in that an auxiliary lens 10 for guiding or diffusing light is additionally arranged in front of the second focus f4 of the third reflecting surface 8 on the optical paths from the third reflecting surface 8 to the ring-shaped lens 9. The auxiliary lens 10 allows the form of light-emission described in the first embodiment to be emphasized more. For instance, if there is no auxiliary lens 10, a part of light from the light source 3 to be received by the second reflecting surface 7 is blocked as the lens holder 6 is used. Thus, a perfect ring form of the light emission cannot be obtained. On the other hand, if a light-diffusing lens is provided as the auxiliary lens 10, discontinuous edges of adjacent light-illuminating parts 13 from the third reflecting surface 8 are overlapped or the like to make an obscure boundary between them to provide a ring-shaped light emission form with a continuous periphery.

Figure 5:
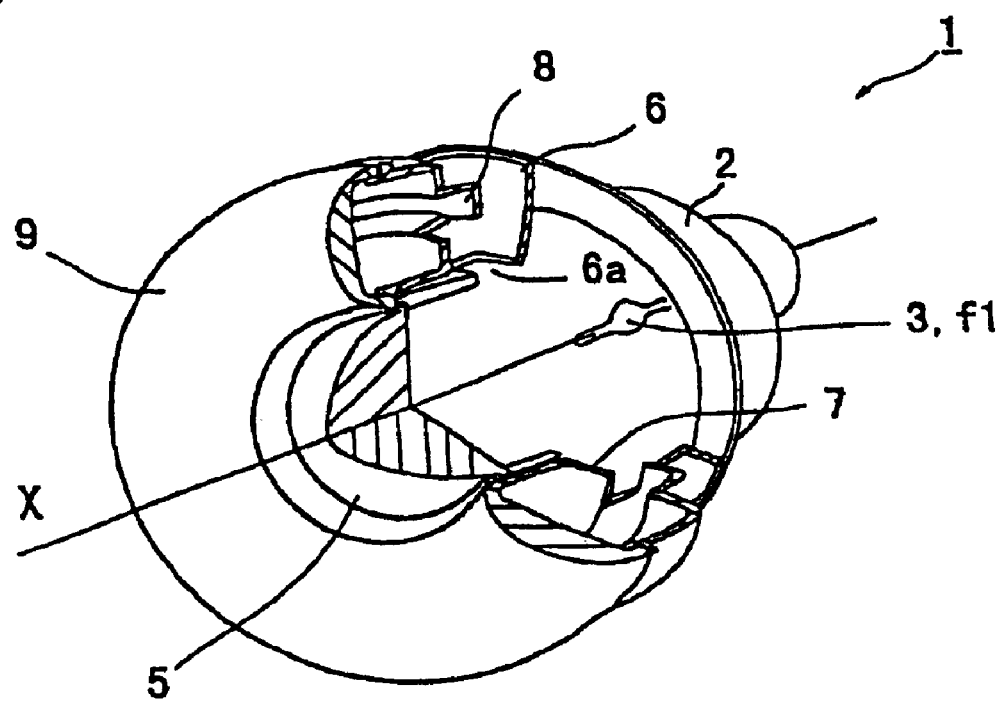
FIG. 5 is a schematic perspective view of the headlight according to the invention, which is partially cut.

FIG. 5 is a perspective view of the headlight 1 for illustrating the configuration of each of the first and second embodiments. In this figure, some structural components are omitted from the illustration and interested components are partially exploded for the sake of clarification. As is also evident from the drawing, the second reflecting surface 7 and the third reflecting surface 8 can be integrally formed together, so that an appropriate form of light emission can be attained by providing these reflecting surfaces 7 and 8 and partially providing the opening 6a.

Figure 6:
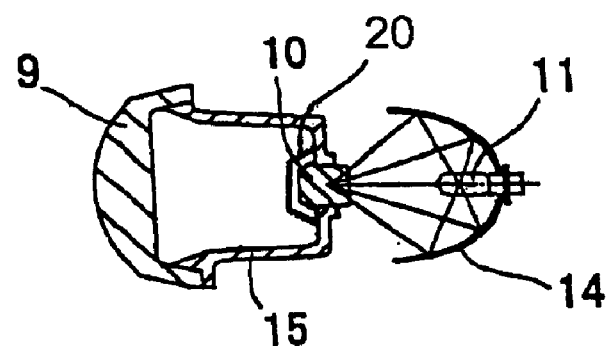
FIG. 6 is a cross sectional view showing a headlight according to a third embodiment of the present invention.

FIG. 6 shows an essential part of a third embodiment of the invention. In the third embodiment, the configuration of each of a headlight which employs a projection system, a second reflecting surface 7, a third reflecting surface 8, and a ring-shaped lens 9 is the same as that of the second embodiment, and thus some of these structural components are omitted from the figure. In the third embodiment, an auxiliary light source 11 such as a position lamp, which is separately provided in addition to the light source 3, is arranged on a portion where the second and third reflecting surfaces 7 and 8 are not formed. Therefore, a part of the ring-shaped lens 9 is allowed to be illuminated by light emitted from the auxiliary light source 11. In this case, an elliptically shaped auxiliary reflecting surface 14 having a first focus on the auxiliary light source 11 may be provided. The illumination characteristics of the auxiliary light source 11 can be adjusted by arranging the second focus of the auxiliary reflecting surface 14 on a position of the focus of the auxiliary lens 10. Further, a colored filter 20 may be placed in front of the auxiliary lens 10 to allow the ring-shaped lens 9 to irradiate colored light. Therefore, the headlight of the present embodiment can be provided as one having the position lamp similar to the conventional headlight.

Figure 7:
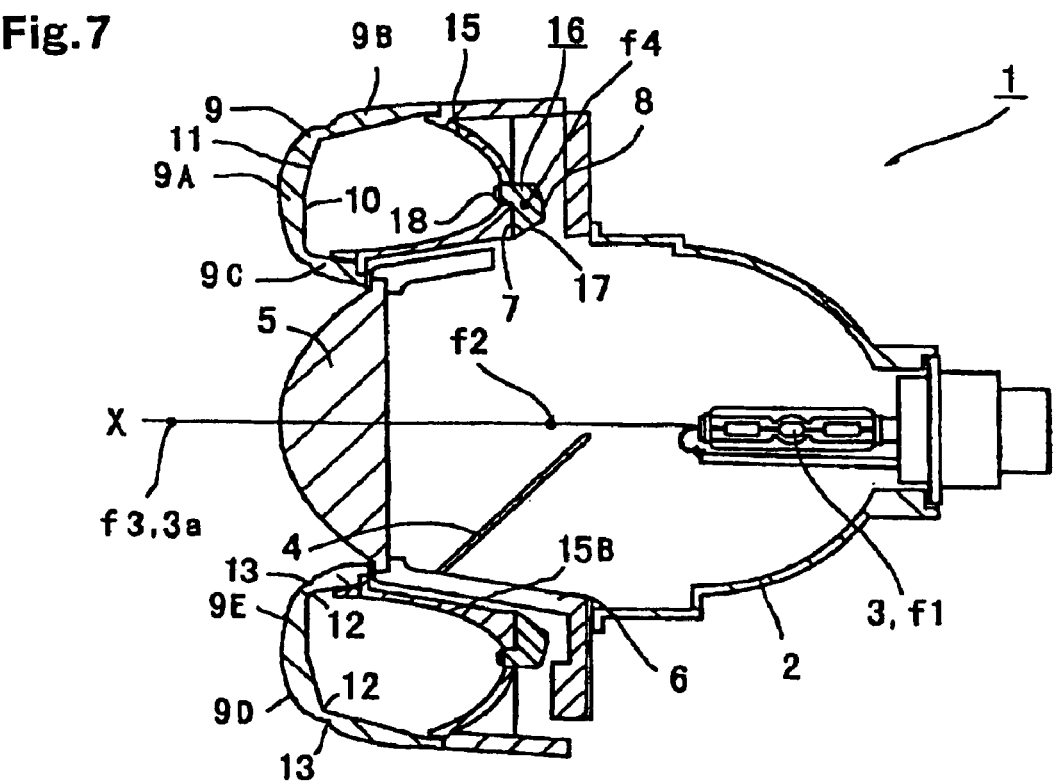
FIG. 7 is a cross sectional view showing a headlight according to a fourth embodiment of the present invention.

Referring now to FIG. 7, there is shown a fourth embodiment of the present invention. In this embodiment, the physical relationship among a headlight which employs a projection system, a second reflecting surface 7, a third reflecting surface 8, and a ring-shaped lens 9 is the same as that of the first embodiment. In addition, a light-shielding plate 4 may be also arranged in place just as in the case with the first embodiment. In this embodiment, the second and third reflecting surfaces 7 and 8 are formed as the respective parts of a light-guiding body 16. Hereinafter, the light-guiding body 16 and the ring-shaped lens 9 used in the present embodiment will be described in detail.

Figure 8:
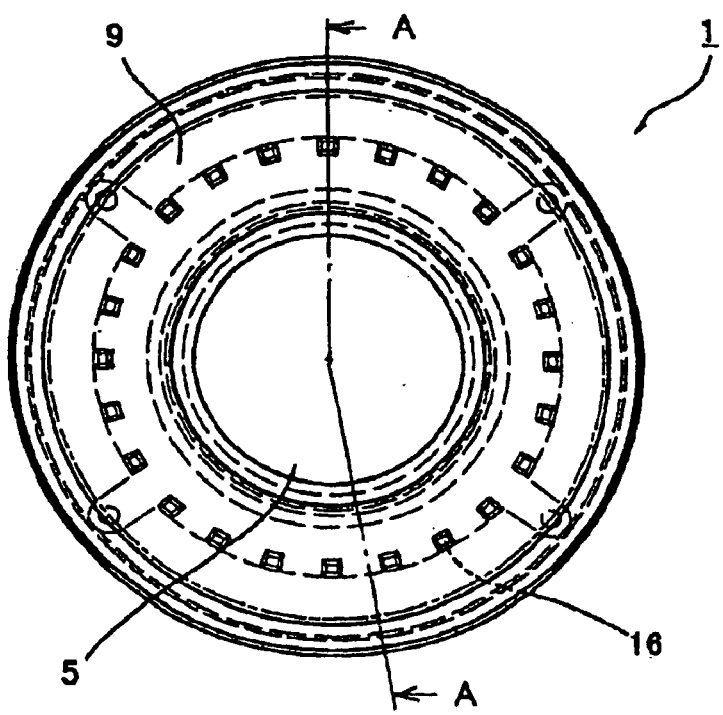
FIG. 8 is a front view showing the shape of light irradiated from the ring-shaped lens in the headlight according to the fourth embodiment.

In this embodiment, in addition to the ellipse group reflecting surface 2, there is provided a light-guiding body 16 made of a transparent material and having a light incident surface 17, a second reflecting surface 7, a third reflecting surface 8, and light-outgoing surfaces 18. The light-outgoing surfaces 18 are arranged such that they can be observed as being circumferentially scattered around as shown in FIG. 8. Furthermore, as shown in the figure, a ring-shaped lens 9 is arranged on the periphery of the projection lens 5 such that it is positioned in front of the light-guiding body 16. In the present embodiment, the second reflecting surface 7 is located at a position between the ellipse group reflecting surface 2 and the projection lens 5, where the second reflecting surface 7 can receive light directly from the light source 3 through the light incident surface 17 included in the light-guiding body 16. The second reflecting surface 7 is substantially orthogonal to the axis X of the headlight 1, so that light from the light source 3 can be reflected in a backward direction opposite to the illumination direction of the headlight 1. The second reflecting surface 7 and the third reflecting surface 8 can be formed by subjecting the outer surfaces of the light-guiding body 16 to an aluminum deposition or the like. Incidentally, the light incident surface 17 may be formed as a concave surface or the like to enhance the ability of receiving light from the light source. Furthermore, the light-outgoing surface 18 may be formed to have a lens action similar to that of the auxiliary lens 10.

The third reflecting surface 8 is arranged at a position where light emitted from the light source 3 and reflected on the second reflecting surface 7 is received. The third reflecting surface 8 reflects the light in the direction which is substantially the same as the illumination direction of the headlight 1. The light reflected from the third reflecting surface 8 is emitted from the light-outgoing surface 18 of the light-guiding body 16. A part of the light emitted from the light-outgoing surface 18 is reflected on an auxiliary reflecting surface 15 composed of a concave curve formed around the light-outgoing surface 18 (the surface 15 corresponds to the wall portion 15 having a reflective-function in the first embodiment) and is then emitted toward the front of the headlight.

The ring-shaped lens 9 is shaped like a letter U in cross section and is also shaped like a ring formed by rotating the cross section of the letter U turned sideways (see FIG. 7) around the axis X of the headlight 1 or one formed by cutting off a part of such a ring. The lens 9 is provided as a cylindrical lens such that the sides of the U-shaped cross sectional form of the lens 9 correspond to aspheric lenses 9A, 9B, and 9c, respectively, while the focal length of each of them may be adjusted within the range of 5 mm to 60 mm. The front side lens 9A is located at a position corresponding to a middle side (i.e., a bottom) between opposite sides of the U shape and is correctly opposite to the light-outgoing surface 18 of the light-guiding body 16. The front side lens 9A is substantially shaped like a ring when viewed from the front. In addition, the front side lens 9A has a focus near the second focus f4 of the third reflecting surface 8. Incidentally, the focal position of the front side lens 9A may be arranged behind the second focus f4 of the third reflecting surface 8 depending on the required light distribution.

As described above, the lens 9 of the present embodiment is shaped like a letter U in cross section. In other words, there is a joint portion (hereinafter, referred to also as a bent portion) generated at each joint between the adjacent lens parts on an inner or outer surface thereof. For example, as shown in FIG. 7, lens inner surface bent portions 12 and lens outer surface bent portions 13 are generated. In addition, different portions or different faces on which gradual variations may be occurred are connected to each other to generate similar bent portions on the lens surface or between the lenses. In this embodiment, for example, there are two bent portions shown in FIG. 7, a bent portion 9D between the front side lens 9A and the peripheral-side lens 9B and a bent portion 9E between the front side lens 9A and the inner peripheral-side lens 9C. In this embodiment, a line connecting between the inner surface bent portion 12 and the outer surface bent portion 13 and these bent portions are arranged at their respective proper positions such that these positions do not coincide with the substantial illumination direction of light irradiated from the light-outgoing surface 18 of the light-guiding body 16.

In the present embodiment, the peripheral-side lens 9B of the ring-shaped lens 9 is provided as a cylindrical lens in cross section so as to provide visual effects of a heavy wall thickness and/or a crystal glass (i.e., in a state of having both a transparent feature like a crystal glass and a metallic feature of the auxiliary reflecting surface 15) when the headlight 1 is visually observed. In addition, the peripheral-side lens 9B is provided such that the surface 15B facing to the lens 9B or the focus thereof, and the focus of the lens 9B do not coincide with each other. Incidentally, the ring-shaped lens 9 may be prepared such that the cross-sectional profile of each of three sides of the U-shaped cross-section of the ring-shaped lens 9 may be a cylindrical lens or at least one side lens thereof may be an aspheric surface. Therefore, the ring-shaped lens 9 may be a lens having aspheric surfaces provided on opposite sides. In addition, the inner peripheral-side lens 9C may be shaped like any form other than a cylindrical form.

On the other hand, the second reflecting surface 7 reflects only the light directly emitted from the light source 3 toward the third reflecting surface 8. At this time, the third reflecting surface 8 is composed of a reflecting surface obtained by rotating an ellipse around the axis X. The ellipse has the first focus f3 and the second focus f4, the first focus f3 is positioned at a position of the pseudo-light source 3a assumed when the light emitted from the light source 3 is reflected from the second reflecting surface 7, and the second focus f4 is positioned in the vicinity of the outer periphery of the second reflecting surface 7. Therefore, the light reflected by the third reflecting surface 8 converges to the second focus f4 of the ellipse. Therefore, the light irradiated from the ring-shaped lens 9 is one irradiated as diffused light.

In the present embodiment, furthermore, the ring-shaped lens 9 may be a cylindrical lens, where cross sections thereof corresponding to the respective sides of the U-shaped form are aspheric lenses. Therefore, when the ring-shaped lens 9 is observed from an appropriate position that surrounds the ring shaped lens 9 (in the radial direction) during the daytime where the headlight is being turned off, the auxiliary reflecting surface 15 can be visualized as an enlarged one. Thus, without depending on the direction of view as a whole, the appearance of the headlight can be expressed as a feeling of heavy wall thickness, a three-dimensional impression, and a feeling of a crystal glass. Especially, the headlight may have a feeling of depth because the surface of the reflecting surface 15B or the focus of the reflecting surface 15B and the focus of the peripheral-side lens 9B (i.e., the cylindrical lens) do not coincide with each other.

Furthermore, the ring-shaped lens 9 is configured such that the positions of lens inner and outer bent portions 12 and 13 are different from each other. This is achieved by positioning a line connecting between the lens inner surface bent portion 12 and the lens outer surface bent portion 13 surrounded by three sides of the U-shape cross section so as not to coincide with the direction of light irradiated from the light-outgoing surface 18 of the light-guiding body 16 at each of the bent portions 12 and 13. Therefore, when viewing the ring-shaped lens 9 from an appropriate position surrounding the ring-shaped lens 9, an overlapped portion between the lens inner bent portion 12 and the lens outer bent portion 13 fades into the background. Therefore, it becomes possible to obtain a continuous appearance seamlessly without depending on the direction of view as a whole.

In this embodiment, by the way, the inner surface 10 of the front side lens 9A of the ring-shaped lens 9 is not linear in cross section but is provided with an inclined portion 11 slanted to the backward of the lamp together with the inner surface 10 of the linear portion substantially in the normal line. Therefore, the light illumination range can be broadened, so that the impressive continuity of appearance (uniformity of illuminated light and uniformity of the interior of the lens when viewed from outside) can be improved. The inner surface 10 may be provided as a multistage composite surface having a plurality of inclined portions.

According to the fourth embodiment, the second reflecting surface 7, the third reflecting surface 8, and the auxiliary lens 10 can be integrally formed as a light-guiding body 16, so that the number of components can be reduced in addition to simplify the steps to be required for the fabrication of the headlight. In the fourth embodiment, as a modified example, the light-guiding body 16 may have a ring shape, or a part of the ring-shape of the light-guiding body 16 may be cut away as shown in FIG. 8 to create an aesthetic impression on the sense of sight.

Figure 9:
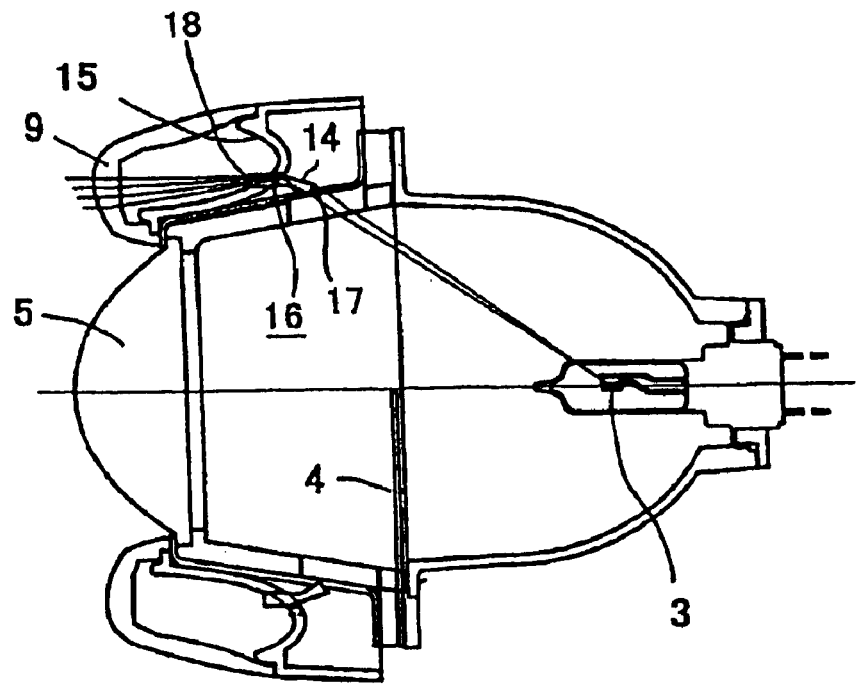
FIG. 9 is a cross sectional view showing a headlight according to a fifth embodiment of the present invention.

Referring now to FIG. 9, there is shown a headlight as a fifth embodiment of the present invention. In this embodiment, the headlight is principally based on a projection system. In addition, a peripheral light-emitting unit is provided around the projection lens 5 and includes a light-guide body 16 as an introducing portion for guiding light from the light source 3, an auxiliary reflecting surface 15 being a concave curve in cross section with an introducing portion, and a ring-shaped lens 9, just as in the case with the configuration of the headlight of the first embodiment.

The fifth embodiment differs from the fourth embodiment in that the reflecting surface equipped on the light guiding body 16 made of a transparent material is only a fourth reflecting surface 14. That is, the direct light from the light source 3 passes through the light incident surface 17 of the light-guiding body 16 and reaches to the fourth reflecting surface 14, followed by reflecting in the illumination direction of the headlight. The reflected light passes through the light-outgoing surface 18 of the light-guiding body 16, followed by emitting toward the ring-shaped lens 9 arranged in front of the light-outgoing surface 18.

Figure 10:
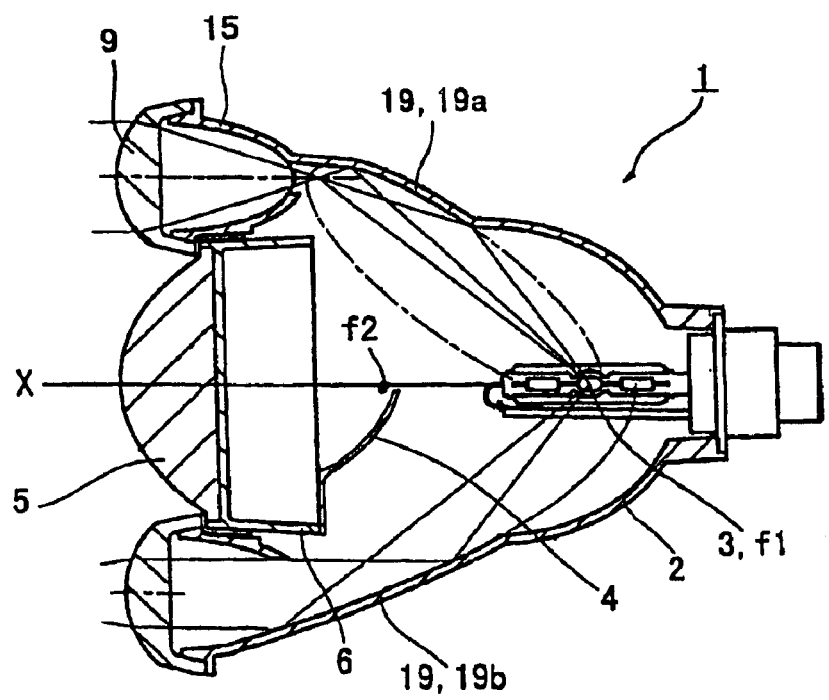
FIG. 10 is a cross sectional view showing a headlight according to a sixth embodiment of the present invention.

Referring now to FIG. 10, there is shown a sixth embodiment of the present invention. In this embodiment, the configuration of a headlight which employs a projection system is the same as that of each of the embodiments described above, except that a fourth reflecting surface 19 is formed in this embodiment instead of the second and third reflecting surfaces 7 and 8 in the other embodiments described above.

The fourth reflecting surface 19 is provided for capturing direct light from a light source 3 to a lens holder 6 that connects an ellipse group reflecting surface 2 with a projection lens 5 in the headlight which employs the projection system. For instance, the fourth reflecting surface 19 is seamlessly connected with the ellipse group reflecting surface 2. At this time, an opening may be formed in the optical path extending from the light source 3 to the fourth reflecting surface 19 just as in the case with the first embodiment, or the lens holder 6 may be made of a transparent material. Furthermore, the lens holder may be omitted. The ellipse group reflecting surface 2 and the fourth reflecting surface 19 may be integrally formed together, while making a part of the fourth reflecting surface 19 as supporting means to support the projection lens 5 or the like.

In the following description, the fourth reflecting surface 19 will be explained in more detail. As shown in the upper half of FIG. 10, the fourth reflecting surface 19 is arranged at a position where light emitted from the light source 3 directly reaches to a space between the ellipse group reflecting surface 2 and the projection lens 5. The fourth reflecting surface 19 is shaped like an ellipse group reflecting surface 19a having a first focus located at a position corresponding to the light source 3 and a second focus located at a position in the vicinity of the ring-shaped lens 9 and outside the projection lens 5. The fourth reflecting surface 19 is allowed to reflect part of light from the light source 3 in the illumination direction of the headlight 1 through the space between the ellipse group reflecting surface 2 and the projection lens 5, resulting in an increased efficiency of using the light.

As represented by a modified example in a lower half of FIG. 10, alternatively, the fourth reflecting surface 19 may be provided as a parabolic reflecting surface 19b having a focus located at a position corresponding to the light source 3 and reflecting light in the illumination direction of the headlight 1. Furthermore, though not shown in the figure, the fourth reflecting surface 19 may be alternatively formed as a flat reflecting surface or a free curved reflecting surface. In FIG. 10, for purposes of illustration, the upper and lower halves are provided for showing the configurations of the different reflecting surface 19a, 19b, respectively. According to the present invention, as a matter of course, the fourth reflecting surface 19 may be a combination of different kinds of the reflecting surfaces as shown in the figure or may be a single type reflecting surface.

Furthermore, in the illumination direction from the fourth reflecting surface 19, similar to the other embodiments described above, there is provided a ring-shaped lens 9 which is shaped like a ring or a ring with a notched portion. In this embodiment, the ring-shaped lens 9 is configured such that the lens form is changed depending on a kind of the fourth reflecting surface 19 to obtain desired light distribution characteristics.

As described above, among light emitted from the light source 3, invalid light in the conventional headlight can be used effectively in accordance with the present embodiment, just as with the other embodiments described above, resulting in a more bright headlight 1 with a simplified structure which can be fabricated with a smaller number of components.

Figure 11:
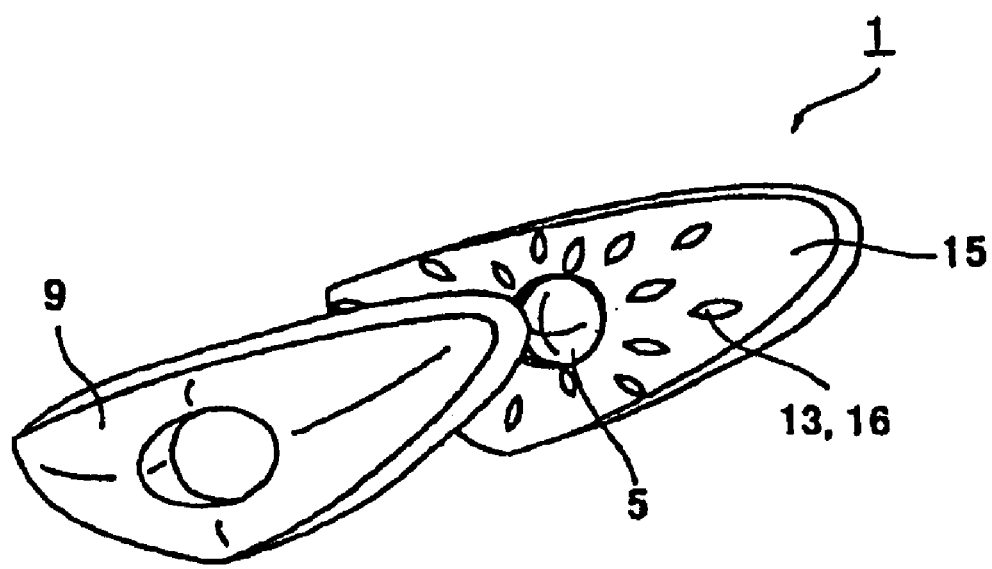
FIG. 11 is a schematic view showing a variation of the present invention.

Next, FIG. 11 illustrates a modified example of each embodiment. In each of the above embodiments, the ring-shaped lens 9 formed around the projection lens 5 of the headlight 1 is substantially in the shape of a circle. The present invention, however, is not limited to such a shape as far as the ring-shaped lens 9 is formed around the projection lens 5 as shown in FIG. 11. Therefore, the ring-shaped lens 9 may be provided as a peripheral lens assembly having any shape other than a ring shape, which corresponds with the shape of a vehicle on which the headlight 1 is to be mounted.

Furthermore, though not shown in the figure, the headlight 1 may be configured as a single headlight composed of a plurality of projection lamps to selectively provide high and low beams. Alternatively, the configuration of the present invention may be applied to a projection system lamp having a plurality of projection lenses for one main ellipse group reflecting surface. Each of these projection lenses and the ring-shaped lenses formed therearound may be shaped like an ellipse, a square, or a cylinder in addition to a circle. In this case, it is a matter of course that each of other reflecting surfaces and light-guiding bodies may be appropriately shaped so as to correspond to the form of the above projection lens or the ring-shaped lens.

As a still further modified examples of the above embodiment, the joint portions for connecting the second and third reflecting surfaces 7 and 8, the wall portion 15 or the extension, the auxiliary reflecting surface 15 including the concave curved surface and the like may be colored with any color (e.g., a body color, a metal color such as aluminum deposition) other than a lens color without changing a functional color as a lamp. In this constitution, the colored joint portion, the wall portion 15 or the extension, the auxiliary reflecting surface 15 and the like can be viewed through the ring-shaped lens 9 such that color of an outward appearance may be of a vehicle's body color or a color of increasing a commercial value. In addition, the material that forms the joint portion 12, the wall portion 15, the extension, the auxiliary reflecting surface 15 or the like may be a high intensity material (high intensity aluminum, high intensity resin) without requiring a surface treatment.

Furthermore, in order to allow the projection lens 5 or the ring-shaped lens 9 to irradiate colored light with required function, it is possible to directly color the lens 5 or 9, or to provide a colored filter with a functional color between the light source 3 and the lens 5 or 9. This makes it possible to provide different visibilities depending on whether the lamp turns on or off. Additionally, the auxiliary lens 10 or the light-guiding body 16 may be also formed of a transparent material which is colored such that a functional color to be required for lighting equipment can be expressed.

Furthermore, light which is guided by the second reflecting surface 7, the third reflecting surface 8, and the ring-shaped lens 9 may be generated such that the headlight 1 irradiate the light toward another position different from the position on which light is mainly distributed from the headlight 1, for example, so as to satisfy the light distribution standard of overhead sign (light distribution including an area slightly upward in the horizontal direction of the headlight) or the like. Therefore, the light distribution characteristics of the headlight 1 can be changed without any restriction.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A headlight, employing a projection system having a light source, an ellipse group reflecting surface, and a projection lens, the headlight comprising:
   a second reflecting surface, shaped like a ring or a ring with a notched portion, for reflecting the light directly reaching to a space between the ellipse group reflecting surface and the projection lens among light emitted from the light source such that the light is reflected backward in a direction opposite to an illumination direction of the headlight, the second reflecting surface being provided around the projection lens;
   a third reflecting surface, shaped like a ring or a ring with a notched portion, for reflecting the light, reflected from the second reflecting surface, toward the illumination direction of the headlight; and
   a ring-shaped lens, shaped like a ring, the ring-shaped lens being arranged on a side in the illumination direction of the third reflecting surface.

2. The headlight according to claim 1, wherein
   the second reflecting surface is a flat surface,
   the third reflecting surface is provided as an ellipse group reflecting surface obtained by rotating an ellipse around a central axis of the headlight, the ellipse having a first focus in the vicinity of a position where a pseudo-light source of light, which light is emitted from the light source and reflected by the second reflecting surface, is assumed and a second focus arranged on an outer side of the second reflecting surface and having a long axis inclined to the central axis of the headlight; and
   the ring-shaped lens is a ring-shaped cylindrical lens obtained by rotating a sectional form of an aspheric lens having a focus thereof on a position corresponding to or behind the second focus of the third reflecting surface.

3. The headlight according to claim 1, further comprising a lens holder for fixing the projection lens on the ellipse group reflecting surface, the lens holder having an opening for allowing light from the light source to pass therethrough to the second reflecting surface, wherein
   the second reflecting surface and the third reflecting surface are integrally formed together; and
   the opening is formed except on a joint portion between the second reflecting surface and the third reflecting surface so that the light reflected from the second surface is irradiated onto the third reflecting surface.

4. The headlight according to claim 1, wherein each of the second reflecting surface and the third reflecting surface is a reflecting surface prepared by applying reflective means on a surface of a light-guiding body made of a transparent material.

5. The headlight according to claim 1, wherein a light-guiding lens is arranged between the third reflecting surface and the ring-shaped lens.

6. The headlight according to claim 1, wherein at least one of joint portions of the second reflecting surface and the third reflecting surface and a wall portion of the ring-shaped lens is colored with a color except a color of the ring-shaped lens.

7. The headlight according to claim 1, wherein a Fresnel lens is formed on at least one of the projection lens and the ring-shaped lens.

8. The headlight according to claim 1, wherein a notched portion is formed in part of the third reflecting surface and is provided with a second light source for irradiating light toward the ring-shaped lens.

9. The headlight according to claim 1, wherein a filter is equipped in a space between the light source and the projection lens or the ring-shaped lens for diffusing or coloring light to be emitted from the headlight.

10. The headlight according to claim 1, wherein a diffusion lens is arranged between the third reflecting surface and the ring-shaped lens.

11. A headlight, employing a projection system having a light source, an ellipse group reflecting surface, and a projection lens, the headlight comprising:
a plurality of peripheral reflecting surfaces, each having a focus, provided to collectively surround part of the circumference of the projection lens, for reflecting light directly reaching to a space between the ellipse group reflecting surface and the projection lens among light emitted from the light source such that the light is reflected in an illumination direction of the headlight;
a ring-shaped lens, shaped like a ring and consisting of a singular lens, the ring-shaped lens being arranged on the side in the illumination direction of the peripheral reflecting surface.

12. The headlight according to claim 11, wherein the peripheral reflecting surface is one selected from an ellipse group reflecting surface having a first focus located on the light source and a second focus located in the vicinity of the ring-shaped lens, a parabolic reflecting surface having a focus located on the light source, a flat reflecting surface, and a free curved reflecting surface.

13. The headlight according to claim 11, wherein a Fresnel lens is formed on the projection lens.

14. The headlight according to claim 11, wherein a filter is equipped in a space between the light source and the projection lens or the ring-shaped lens for diffusing or coloring light to be emitted from the headlight.

15. A headlight, employing a projection system having a light source, a main reflecting surface, and a projection lens, the headlight comprising:
a peripheral light-emitting unit, provided around the projection lens, for irradiating light from the light source, wherein the peripheral light-emitting unit includes:
a light-introducing part for receiving and guiding light from a position between the light source and the projection lens;
an auxiliary reflecting surface having a concave curved surface; and
a peripheral lens assembly at least comprising a peripheral-side lens and a forward-lens which are provided as a cylindrical lens, and
the auxiliary reflecting surface faces the peripheral lens assembly, and the peripheral-side lens of the peripheral lens assembly is provided as the cylindrical lens having a focus which is not positioned on the auxiliary reflecting surface or at a focus of the auxiliary reflecting surface.

16. The headlight according to claim 15, wherein
the peripheral lens assembly is configured to have a letter U cross section in a part thereof, the U cross section being composed of an inner peripheral-side lens, the forward-side lens, and the peripheral-side lens, and
a line connecting between an inner surface bent portion and an outer surface bent portion, which are found in each of a connecting part between the inner peripheral-side lens and the front-side lens and a connecting part between the front-side lens and the peripheral-side lens, is located at a position where the line does not coincide with a substantial illumination direction of the headlight.

17. The headlight according to claim 15, wherein a cross section of an inner surface of the forward-side lens is composed of a line having at least one bent portion.

18. The headlight according to claim 15, wherein a diffusion lens is arranged between the third reflecting surface and the ring-shaped lens.

19. A headlight, employing a projection system having a light source, a first reflecting surface comprising an ellipse group reflecting surface, a projection lens, and a second reflecting surface provided around the projection lens, the headlight further comprising:
a plurality of light guide part, provided to collectively surround part of the circumference of the projection lens, for receiving and guiding light directly reaching to a space between the ellipse group reflecting surface and the projection lens among light emitted from the light source such that the light is directed in an illumination direction of the headlight;
a ring-shaped lens, shaped like a ring and consisting of a singular lens, the ring-shaped lens being arranged on the side in the illumination direction of the first reflecting surface; and
wherein an outer side of the light guide parts are adjacent to the second reflecting surface.

20. The headlight according to claim 19, the second reflecting surface faces in a concave manner with respect to the ring-shaped lens.

* * * * *